(12) United States Patent
Jordan et al.

(10) Patent No.: US 9,088,658 B2
(45) Date of Patent: Jul. 21, 2015

(54) INTELLIGENT OVERLOAD CONTROL FOR CONTACT CENTER

(75) Inventors: Kenneth Jordan, Groton, MA (US); Khaled A. Gouda, Shrewsbury, MA (US); Paul Schechinger, Londonderry, NH (US)

(73) Assignee: Cisco Technology, Inc., San Jose, CA (US)

( * ) Notice: Subject to any disclaimer, the term of this patent is extended or adjusted under 35 U.S.C. 154(b) by 2084 days.

(21) Appl. No.: 11/710,076

(22) Filed: Feb. 23, 2007

(65) Prior Publication Data

US 2008/0205611 A1 Aug. 28, 2008

(51) Int. Cl.
*H04M 15/00* (2006.01)
*H04M 3/523* (2006.01)
*H04M 3/42* (2006.01)

(52) U.S. Cl.
CPC ........ *H04M 3/5232* (2013.01); *H04M 3/42068* (2013.01); *H04M 3/5238* (2013.01); *H04M 2203/551* (2013.01)

(58) Field of Classification Search
USPC ............. 379/112.01, 112.03, 112.04, 112.06, 379/112.07, 112.08, 112.1
See application file for complete search history.

(56) References Cited

U.S. PATENT DOCUMENTS

| | | | | |
|---|---|---|---|---|
| 5,946,299 | A * | 8/1999 | Blonder | 370/237 |
| 6,327,362 | B1 * | 12/2001 | Hull et al. | 379/243 |
| 7,023,979 | B1 * | 4/2006 | Wu et al. | 379/265.11 |
| 2002/0159576 | A1 * | 10/2002 | Adams | 379/133 |
| 2005/0286688 | A1 * | 12/2005 | Scherer | 379/88.21 |
| 2006/0075491 | A1 * | 4/2006 | Lyon | 726/22 |

OTHER PUBLICATIONS

ITU-T Study Group XI, "ITU-T Q.543, Digital Exchanges, Digital Exchange Performance Design Objectives", ITU, Mar. 1993, 40 pages, Copyright ITU 1994.
U.S. Appl. No. 11/725,065, filed Mar. 16, 2007, Shmuel Shaffer, et al.

\* cited by examiner

*Primary Examiner* — Yosef K Laekemariam
(74) *Attorney, Agent, or Firm* — Parker Ibrahim & Berg LLC; James M. Behmke; Stephen D. LeBarron (57) ABSTRACT

Particular embodiments provide intelligent overload control for contact centers. In one embodiment, an overload condition at a contact center is determined. When the overload condition exists, a contact evaluation metric for a connection to a contact is determined. The contact evaluation metric may evaluate the value of a contact, such as whether the contact is a high-value or low-value contact. An action to perform for the contact is then determined based on the contact evaluation metric. For example, if the contact is considered a high-value contact, then the contact may be serviced; however, if the contact is considered a low-value contact, then the contact may be gapped.

25 Claims, 5 Drawing Sheets

|  | Throughput (High-Value Contacts) @+Y% | Throughput (Low-Value Contacts) @+Y% |
|---|---|---|
| Processed | 36 | 54 |
| Gapped | 24 | 36 |

Table 1

Fig. 3

Table 2

INTELLIGENT OVERLOAD CONTROL FOR CONTACT CENTER

TECHNICAL FIELD

Particular embodiments generally relate to call processing.

BACKGROUND

At times, contact centers can become overwhelmed with the volume of incoming calls from contacts. For example, a contact center may experience a large number of calls such that not all of the calls can be efficiently processed. Accordingly, the contact center may need to redirect or reject a certain number of the calls based on a pre-determined desired level of acceptable performance or a percentage reduction of the incoming contacts. This is typically referred to as contact gapping. The rejection or redirection of contacts is straightforward and may follow a pattern, such as rejecting every fourth contact for a 25% reduction. This method of rejecting contacts is arbitrary and may result in contacts being rejected that may be considered more important than other contacts that are not rejected.

DESCRIPTION OF EXAMPLE EMBODIMENTS

Overview

Particular embodiments provide intelligent overload control for contact centers. In one embodiment, an overload condition at a contact center is determined. When the overload condition exists, a contact evaluation metric for a contact is determined. The contact evaluation metric may evaluate the value of a contact, such as whether the contact is a high-value or low-value contact. An action to perform for the contact is then determined based on the contact evaluation metric. For example, if the contact is considered a high-value contact, then the contact may be serviced; however, if the contact is considered a low-value contact, then contact gapping may be applied, which may reject or redirect the contact.

Example Embodiments

Figure 1:
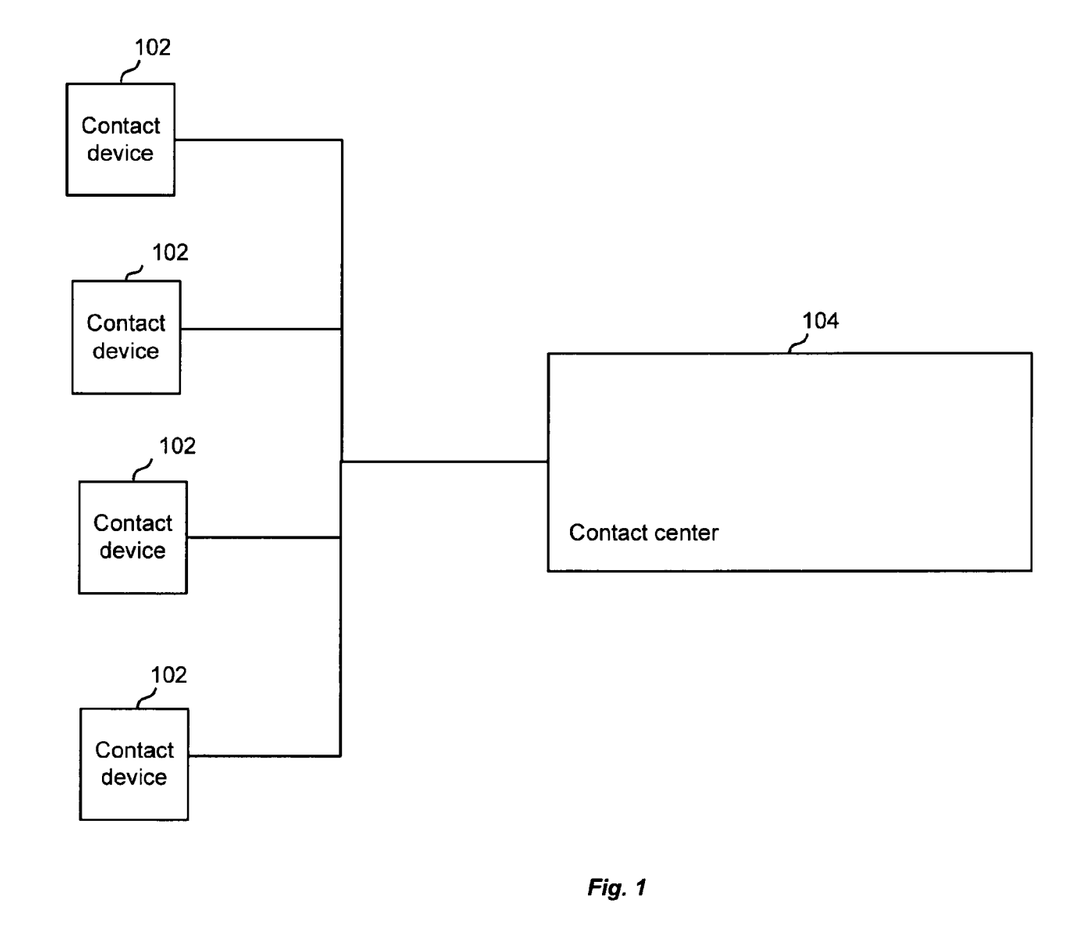
FIG. 1 depicts an example of a system showing a contact center.

FIG. 1 depicts an example of a system showing a contact center. As shown, multiple contact devices 102 and contact center 104 are provided.

Contact devices 102 may be any devices used to communicate with contact center 104. For example, contact devices include cellular telephones, VoIP telephones, PSTN telephones, laptop computers, personal computers, e-mail devices, instant messaging clients, etc. Thus, contacts may use contact devices 102 to communicate with contact center 104 through any media. For example, a user may send an e-mail to contact center 104, make a call to contact center 104, instant message contact center 104, etc. Contacts may be human users and also may be applications and machines.

Contact center 104 may be any entity that may receive communications from a contact. In one embodiment, contact center 104 provides customer support for a business entity. Although a contact center 104 is described, it will be understood that contact center 104 may be any entity that receives multiple communications from contact devices 102. Also, although contact center 104 is shown as a single entity, it will be understood that contact center 104 may include multiple contact centers in different locations.

At times, contact center 104 may become experience an overload condition. The overload condition is when a number of contacts cannot be processed at an acceptable performance level. For example, contact center 104 may include a number of customer service agents who can only handle a certain number of contacts at an acceptable performance level. When a certain number of contacts are reached per unit time or the cost to service a number of contact exceeds the engineered systems capacity, then an overload condition may exist. Also, some degradation in service ability, such as network degradation, may cause the ability to service contacts to go down. Thus, what would normally be considered a standard load may now be considered an overload condition. When an overload condition exists, certain actions are taken by contact center 104 to lessen the load. For example, contacts may be gapped. Contact gapping may be any action taken to reduce load, such as rejecting or redirecting contacts. Contacts may be rejected in that the contacts may be told to call back at a later time, the contacts may be redirected to another contact center, redirected to an automated system, etc. Other actions that reduce load may also be appreciated when contacts are gapped. This reduces the overall load on contact center 104 and allows contact center 104 to process the contacts efficiently.

Particular embodiments provide intelligent overload control for contacts. For example, a contact evaluation metric is determined for one or more of the contacts. In one embodiment, contacts are considered high value or low value. Then, depending on how overloaded the contact center is, a certain percentage of contacts (X %) are gapped. The contact evaluation metric is used to determine an action to take with a contact. For example, high-value contacts are processed while low-value contacts are either gapped while keeping the overall percentage substantially equal to X %. Accordingly, this may help to maximize the impact for a business in that high-value contacts are processed while low-value contacts are not. This may maximize a contact center's bottom line during overload conditions.

Figure 2:
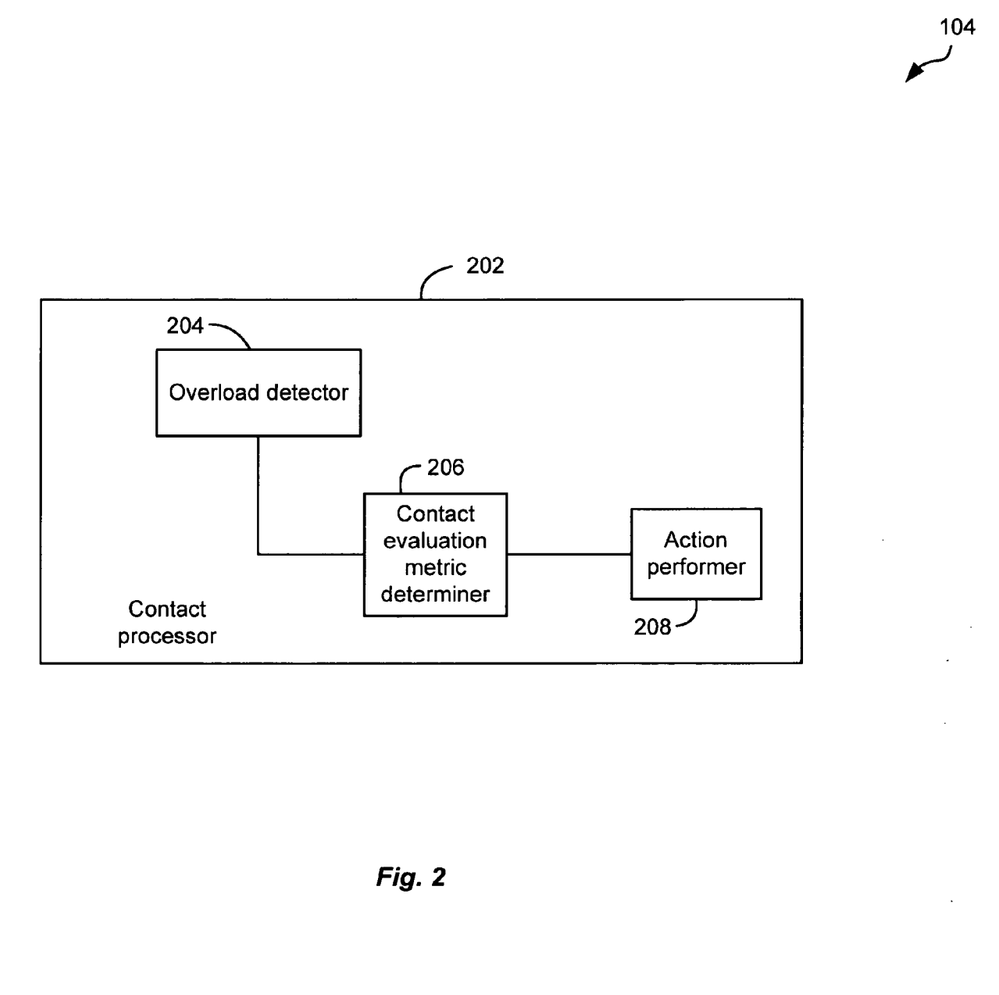
FIG. 2 depicts a more detailed embodiment of the contact center.

FIG. 2 depicts a more detailed embodiment of contact center 104. As shown, a contact processor 202 is configured to process connections with contact devices 102. Contact processor 202 includes an overload detector 204, a contact evaluation metric determiner 206, and an action performer 208.

Overload detector 204 is configured to determine when an overload condition exists in contact center 104. The overload condition may exist for the entire contact center or for a portion of the contact center. For example, if the contact center is partitioned into different subsystem, then a subsystem may be considered in an overload condition. In one example, a group processing complaints may be in overload and another group processing product support may not be in overload.

The overload condition may be determined and detected using different methods. For example, contact center 104 may be configured to process a maximum of a certain number of contacts per unit time. The maximum number of contacts may change as conditions in the contact center change. For example, IT related problems may lower the maximum number of contacts that can be processed.

An overload condition may result when a certain number of contacts over this maximum number is reached. For example, if a contact center can process 100 contacts per unit time, then an overload condition may result when 150 contacts per unit time is reached. This may mean that 150 calls have been received over a certain period of time. This is when a contact center is operating at full capacity. In one example, 50 contacts may be in a queue waiting to be processed while 100 contacts are currently connected to live customer service representatives.

Overload detector 204 may use other factors to determine when an overload condition is reached, such as network conditions, service level agreements (SLAs), performance metrics (resource utilizations and delay analysis), past history of busy durations (busy hour call attempts (BHCA)), as well as projected high-revenue durations (scheduled marketing campaigns).

When an overload condition exists, contact evaluation metric determiner 206 becomes active and determines contact evaluation metrics for a number of contacts. In one embodiment, new incoming contacts may be evaluated using the contact evaluation metric. In another embodiment, a portion of the pending contacts may be re-evaluated. For example, contacts currently waiting in queues for service representatives may be re-evaluated using an updated contact evaluation metric. Also, it will be understood that the contact evaluation metric may be determined prior to an overload condition existing.

The contact evaluation metric may be determined based on a number of factors and also may vary between different contact centers. In one example, the contact evaluation metric may be determined based on information personal to a contact. For example, a contact's potential revenue impact (e.g., a highly-valued investor calling a private team dialed number (DN) or the contact has previously purchased big-ticket items), a contact's criticality (e.g., an emergency call), and customer satisfaction (possibly based on internal customer relation management (CRM) analytics) may be used. Also, current conditions in the contact center may also be used, such as where the contact is in a queue (if the contact is being reevaluated), etc.

The information that may be used to determine the contact evaluation metric may vary. For example, contact evaluation metric determiner 204 may first identify the contact. The contact may be asked to provide identification information, such as an account number, through an automated system, such as an IVR. Also, other information may be used to identify the contact, such as caller ID, dialed number identification service (DNIS), an address for the contact, etc. The contact identifier may be used to determine other information, such as previously-stored CRM data. Other non-contact information may also be used, such as system congestion control performance metrics (e.g., internal severity levels, queue depths, etc.).

The contact evaluation metric for a contact may be a relative value among a group of contacts. For example, the metric gives a relative rank to a contact among other contacts. In one embodiment, a point system may be used to rank the contacts. Also, categories may be used as the metric, such as ranking contacts in a high value or low value category.

Once the contact evaluation metrics are determined, action performer 208 determines an action to perform. For example, a contact may be gapped (rejected or redirected). The redirection may be to a lower cost solution, such as an IVR. Also, the contact may be rejected, such as by a 5XX SIP response, busy signal, play an announcement such as "We're currently experiencing difficulties, please call back at a later time." followed by a call drop, etc. Further, the contact center may reevaluate an existing contact that is found in a queue. For example, the contact may be assigned a contact evaluation metric calculated by contact evaluation metric determiner 206 and depending on the value, action performer 208 may replace the contact with a new contact, reorder in the queue, etc. The gapping may be performed to lower the number of contacts per unit time such that the overload condition may be alleviated.

Figure 3:
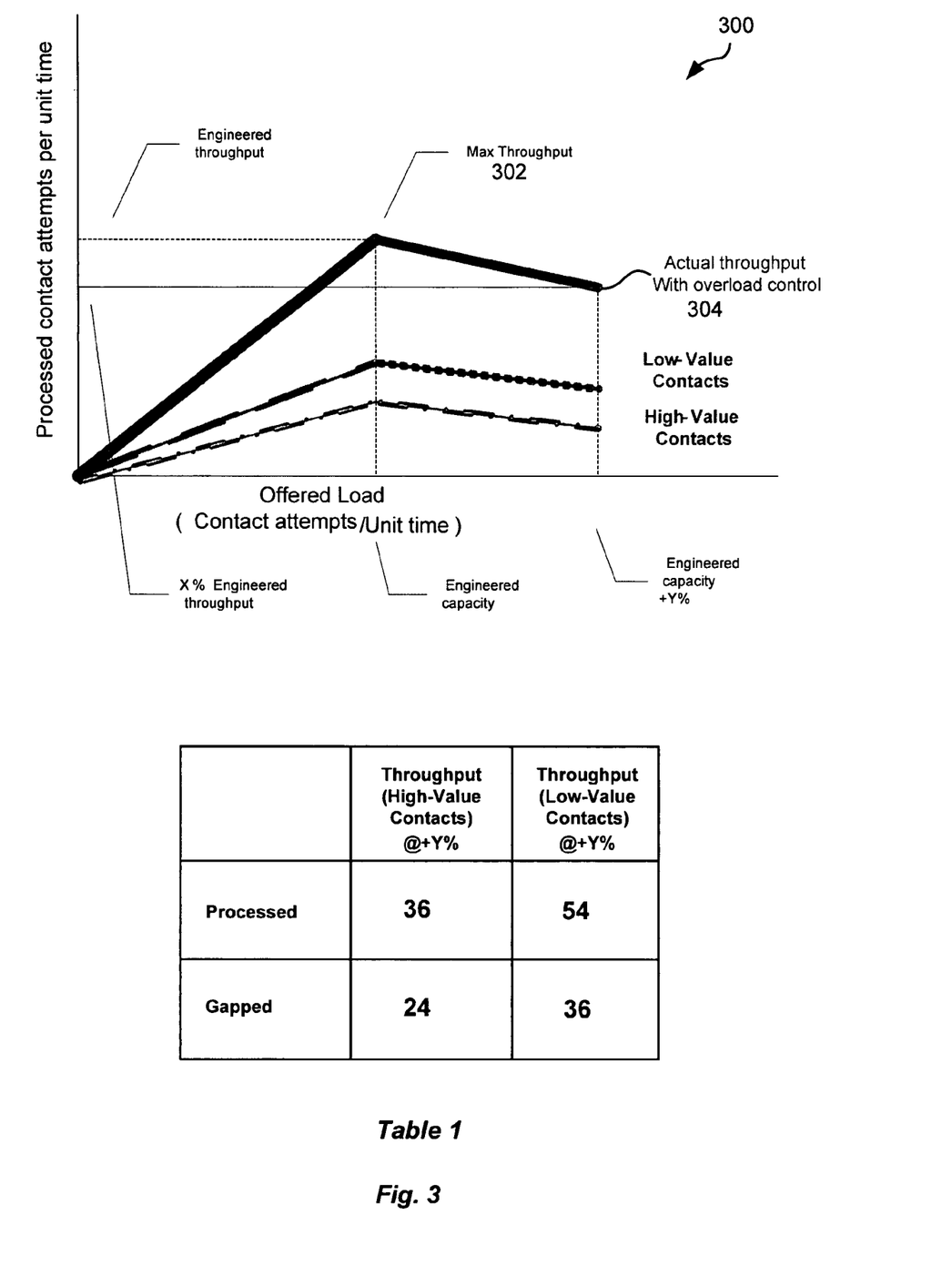
FIG. 3 shows an example of a conventional overload control.

FIG. 3 shows an example graph 300 of conventional overload control. In this example, contact processor 202 is configured to process an engineered capacity of 100 contacts per unit time (hereinafter "engineered throughput") with a maximum sustainable offered load with adequate throughput of 90% of engineered throughput.

In a non-overload condition, 40 out of every 100 contact connections are considered high-value contacts and 60 out of every 100 contact connections are considered low-value contacts. When a typical overload control is applied, contact processing system 202 may be able to process 90% of its engineered throughput at 150% engineered load. Using conventional overload control, the gapping of low-value and high-value contact connections is equally reduced.

Table 1 shows that at 150% offered load (i.e., 150 contact connections per unit time), only 36 high-value contacts are processed, whereas 54 low-value contacts are processed. Thus, 24 high-value contact connections and 36 low-value contact connections are gapped (e.g. redirected or rejected). Accordingly, 24 high-value contacts are gapped while 54 low-value contacts are processed. This may be an undesirable outcome during an overload condition as a large amount of low value contacts are processed while a large amount of high-value contacts are being gapped.

Graph 300 shows that at a max throughput point 302, a certain number of high-value contacts and low-value contacts are processed. Some of these low-value contact contacts and high-value contacts are gapped and thus at a point 304, the high-value contact connections and low-value contact connections have been reduced by an equal amount. However, the number of low value contacts processed is larger than the number of high value contacts.

Figure 4:
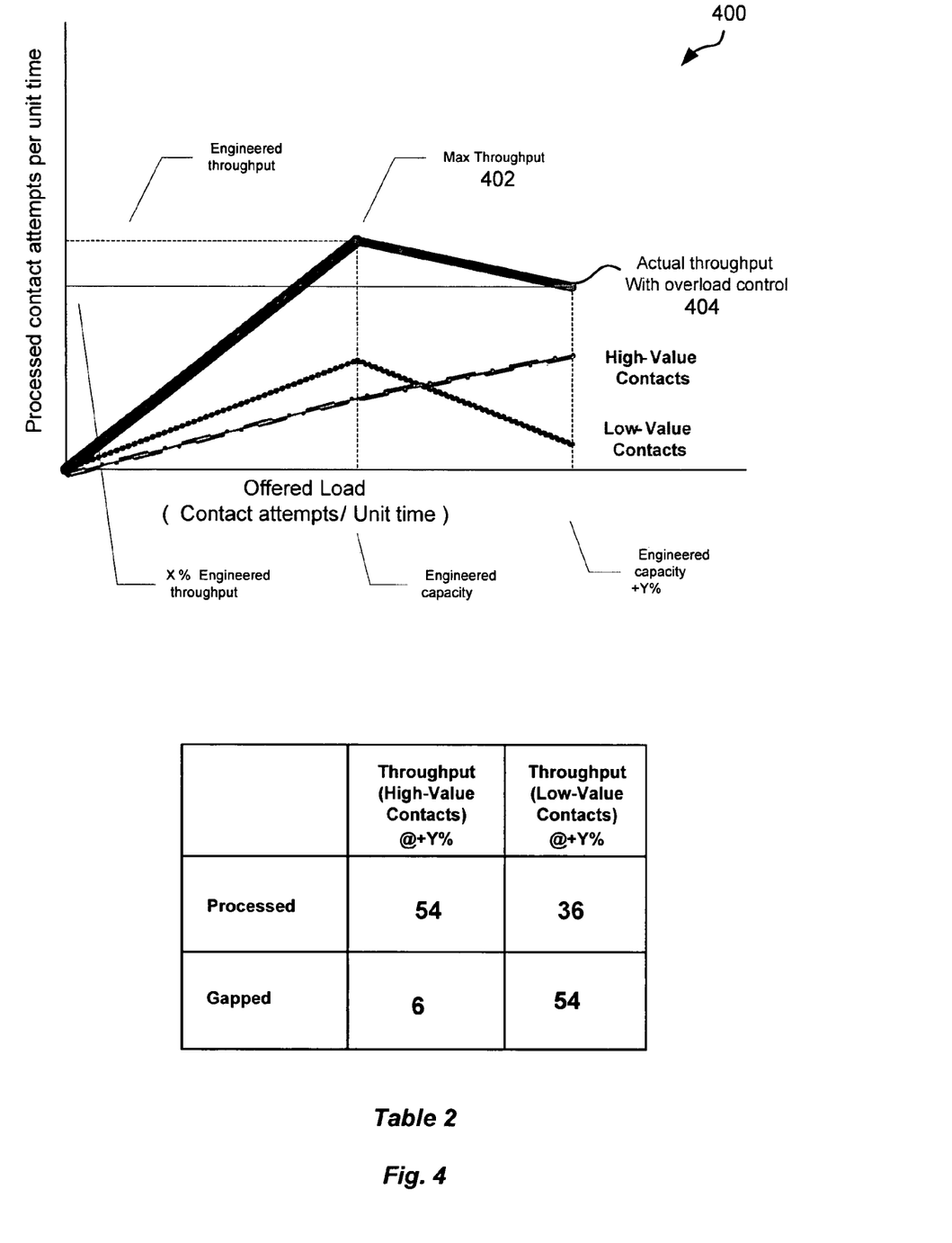
FIG. 4 shows the example of the processing of contacts using intelligent overload control.

FIG. 4 shows the example graph 400 of the processing of contacts using intelligent overload control. FIG. 4 depicts the same system as FIG. 3 but applies the intelligent overload condition processing. In this case, high-value contact processing is maximized while low-value contacts processing is reduced. However, contact processor 202 provides the overall processing objective in reducing the overload condition.

Table 2 shows that at 150% offered load there are 54 high-value contacts being processed whereas only 36 low-value contacts are processed. Six high-value contacts are gapped while 54 low-value contacts are gapped. Thus, the number of high-value contacts that are gapped is distinctively lowered using the intelligent overload condition processing. Also, the number of low-value contacts that are processed is reduced in addition to a large number of low-value contacts being gapped.

In graph 400, at a max throughput point 402, a larger number of low-value contacts are being processed as compared to high-value contacts. However, at a point 404, the number of high-value contacts that have been processed is greater than the number of low-value contact connections that have been processed. Thus, it is more likely that high-value contacts have been processed while the low-value contacts have been gapped. Accordingly, the efficient processing of contact connections is provided in a way that expects to efficiently process contacts favorably based on the contact evaluation metric.

Figure 5:
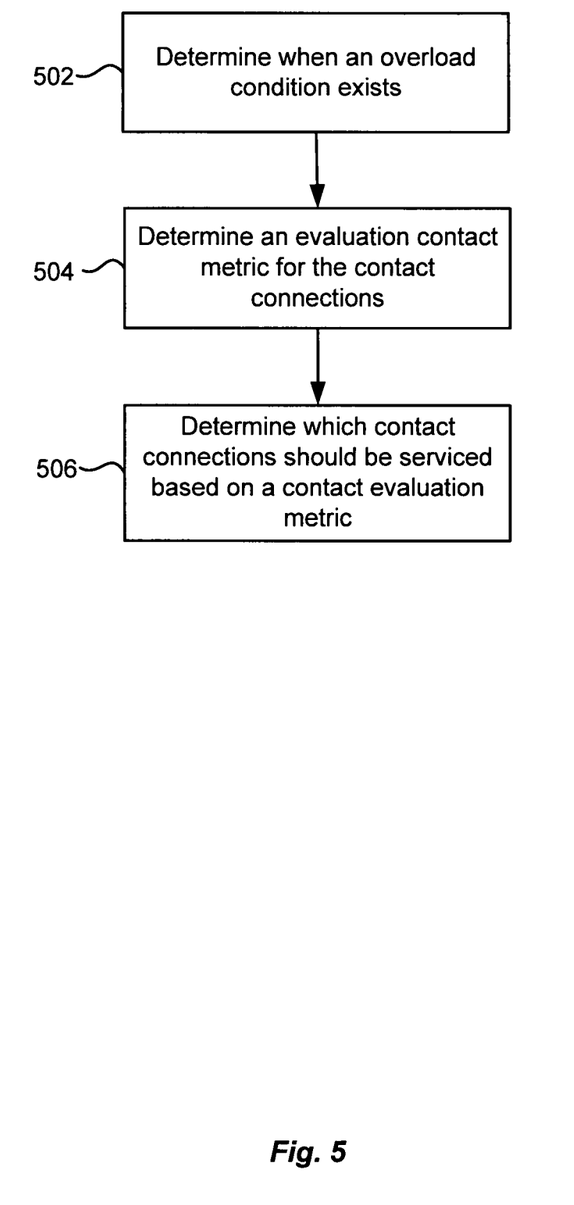
FIG. 5 depicts an example of a method for providing intelligent overload control.

FIG. 5 depicts an example of a method for providing intelligent overload control. Step 502 determines when an overload condition exists.

Step 504 determines an evaluation contact metric for the contact connections. The calculation of the contact evaluation method may depend on a number of factors. The factors described above that related to a contact may be used or any other relevant factors may be used.

Step 506 determines which contact connections should be serviced based on a contact evaluation metric. For example, some contacts may be redirected to low-cost solutions, such as interactive voice response systems, while other high-value contacts may be assigned a higher value in a queue than contacts already in a queue. Other business objectives may also be taken into account in determining which action should be taken.

Although the description has been described with respect to particular embodiments thereof, these particular embodiments are merely illustrative, and not restrictive. Although contact centers are described, it will be understood that a contact center may be any entity that services connections with contacts. Also, although high value and low value categories are discussed, it will be understood that any number of categories may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple ste
shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or ste
will also be considered as being noted, where terminology is foreseen as rendering the ability to separate or combine is unclear. and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
    determining the existence of an overload condition at a contact center, the overload condition defined by at least one of:
        a maximum number of contacts connecting to the contact center, a network condition,
        a service level agreement (SLA),
        a performance metric based on resource utilization and delay analysis, past history of contact attempts during certain times of day, and
        a projected high revenue time period, the projected high revenue time period associated with a scheduled marketing campaign;
    activating a contact metric determiner in response to the determining the existence of an overload condition;
    determining, by the contact metric determiner, a contact evaluation metric for a specific contact connected to the contact center to distinguish the specific contact connected to the contact center from other contacts connected to the contact center, wherein the specific contact is distinguished based on an objective business value relative to the other contacts connected to the contact center, the objective business value being potential revenue impact of the specific contact, a criticality of the specific contact, and customer satisfaction of the specific contact; and
    determining an action to perform for the contact based on the contact evaluation metric, the action being performed based on the overload condition existing.

2. The method of claim 1, wherein the contact evaluation metric comprises a priority value that is assigned to the contact.

3. The method of claim 1, wherein the contact evaluation metric is classifiable into one of a plurality of categories, wherein each category includes a range of values for contact evaluation metrics.

4. The method of claim 1, further comprising:
    determining personal information for the specific contact; and
    using the personal information to determine the contact evaluation metric.

5. The method of claim 1, further comprising determining a number of contacts that need to be gapped based on the overload condition, wherein the action to perform for the specific contact is determined based on the number of contacts that need to be gapped and the contact evaluation metric for the specific contact.

6. The method of claim 1, wherein the action comprises placing the contact in queue for processing based on the contact evaluation metric.

7. The method of claim 1, further comprising:
    determining a plurality of contacts;
    determining, by the contact metric determiner, a plurality of contact evaluation metrics for the plurality of contacts; and
    determining an action for each of the plurality of contacts based on the contact evaluation metrics for the contacts.

8. The method of claim 7, wherein the action comprises gapping a portion of the plurality of contacts based on the contact evaluation metrics.

9. The method of claim 1, wherein the action comprises reevaluating a contact in a queue based on the contact evaluation metric.

10. An apparatus comprising
    one or more processors; and
    logic encoded in one or more tangible media for execution by the one or more processors and when executed operable to:
        determine the existence of an overload condition at a contact center, the overload condition defined by at least one of:
            a maximum number of contacts connecting to the contact center, a network condition,
            a service level agreement (SLA),
            a performance metric based on resource utilization and delay analysis,
            past history of contact attempts during certain times of day, and
            a projected high revenue time period, the projected high revenue time period associated with a scheduled marketing campaign;
        activate a contact metric determiner in response to the determining the existence of an overload condition;
        determine, by the contact metric determiner, a contact evaluation metric for a contact connected to the contact center to distinguish the specific contact connected to the contact center from other contacts connected to the contact center, wherein the specific contact is distinguished based on an objective business value relative to the other contacts connected to the contact center, the objective business value being potential revenue impact of the specific contact, a criticality of the specific contact, and customer satisfaction of the specific contact; and
        determine an action to perform for the contact based on the contact evaluation metric, the action being performed based on the overload condition existing.

11. The apparatus of claim 10, wherein the contact evaluation metric comprises a priority value that is assigned to the contact.

12. The apparatus of claim 10, wherein the contact evaluation metric is classifiable into one of a plurality of categories, wherein each category includes a range of values for contact evaluation metrics.

13. The apparatus of claim 10, wherein the logic when executed is further operable to:
    determine personal information for the specific contact; and
    use the personal information to determine the contact evaluation metric.

14. The apparatus of claim 10, wherein the logic when executed is further operable to determine a number of contacts that need to be gapped based on the overload condition, wherein the action to perform for the specific contact is determined based on the number of contacts that need to be gapped and the contact evaluation metric for the specific contact.

15. The apparatus of claim 10, wherein the logic when executed is further operable to place the contact in a queue for processing based on the contact evaluation metric.

16. The apparatus of claim 10, wherein the logic when executed is further operable to:
   determine a plurality of contacts;
   determine, using the contact metric determiner, a plurality of contact evaluation metrics for the plurality of contacts; and
   determine an action for each of the plurality of contacts based on the contact evaluation metrics for the contacts.

17. The apparatus of claim 16, wherein the logic when executed is further operable to gap a portion of the plurality of contacts based on the contact evaluation metrics.

18. The apparatus of claim 10, wherein the logic when executed is further operable to re-evaluate a contact in a queue based on the contact evaluation metric.

19. An apparatus comprising:
   means for determining the existence of an overload condition at a contact center, the overload condition defined by at least one of:
      a maximum number of contacts connecting to the contact center,
      a network condition,
      a service level agreement (SLA),
      a performance metric based on resource utilization and delay analysis, past history of contact attempts during certain times of day, and
      a projected high revenue time periods, the projected high revenue time period associated with a scheduled marketing campaign;
   means for activating a contact metric determiner in response to the determining the existence of an overload condition;
   determining, by the contact metric determiner, a contact evaluation metric for a contact connected to the contact center to distinguish the specific contact connected to the contact center from other contacts connected to the contact center, wherein the specific contact is distinguished based on an objective business value relative to the other contacts connected to the contact center, the objective business value being potential revenue impact of the specific contact, a criticality of the specific contact, and customer satisfaction of the specific contact; and
   means for determining an action to perform for the contact based on the contact evaluation metric, the action being performed based on the overload condition existing.

20. The apparatus of claim 19, wherein the contact evaluation metric comprises a priority value that is assigned to the contact.

21. The method of claim 1, wherein the maximum number of contacts connected to the call center is based on a maximum number of contacts that the call center can handle during a time period.

22. The method of claim 1, wherein the network condition is based on a network degradation.

23. The method of claim 1, wherein the performance metric is based on at least one of call center resource utilization and call center delay analysis.

24. The method of claim 1, wherein the past history of contact attempts during certain times of the day is based on busy hour call attempts (BHeA).

25. The method of claim 1, wherein the project high revenue time periods are based on scheduled marketing campaigns.

* * * * *

UNITED STATES PATENT AND TRADEMARK OFFICE
CERTIFICATE OF CORRECTION

| | | |
|---|---|---|
| PATENT NO. | : 9,088,658 B2 | Page 1 of 1 |
| APPLICATION NO. | : 11/710076 | |
| DATED | : July 21, 2015 | |
| INVENTOR(S) | : Jordan et al. | |

It is certified that error appears in the above-identified patent and that said Letters Patent is hereby corrected as shown below:

In the specification

In column 5, line 36, please replace:
"ste" with "steps"

In column 6, line 55, please replace:
"ste" with "steps"

In column 6, line 58, please amend as follows:
unclear. As used in the description herein and throughout the claims that follow, "a", "an",

Signed and Sealed this
Tenth Day of November, 2015

Michelle K. Lee
*Director of the United States Patent and Trademark Office*